Aug. 20, 1946. A. M. JENKINS 2,406,224
CLIP OR FASTENER FOR STOVEPIPES AND THE LIKE
Filed June 27, 1944 2 Sheets-Sheet 1

Inventor
Arthur M. Jenkins

By *Clarence A. O'Brien
and Harvey B. Jackson*
Attorneys

Aug. 20, 1946.    A. M. JENKINS    2,406,224
CLIP OR FASTENER FOR STOVEPIPES AND THE LIKE
Filed June 27, 1944    2 Sheets-Sheet 2
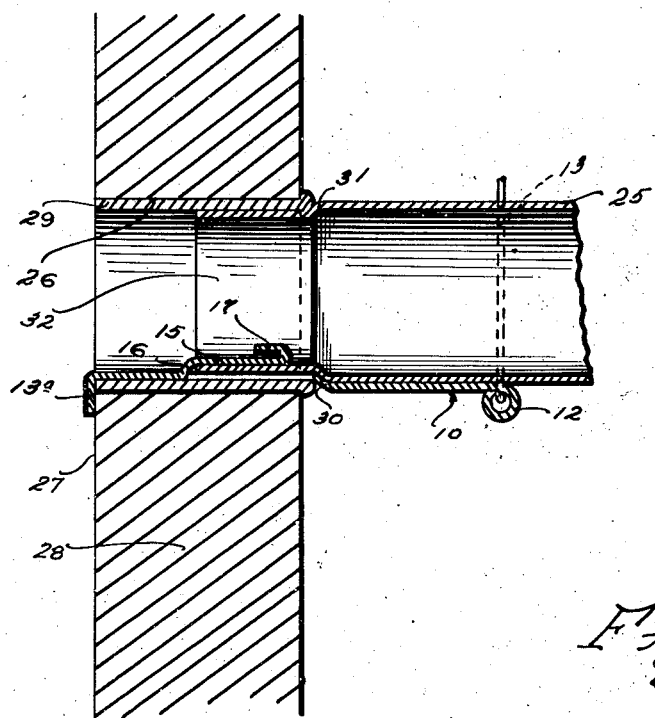
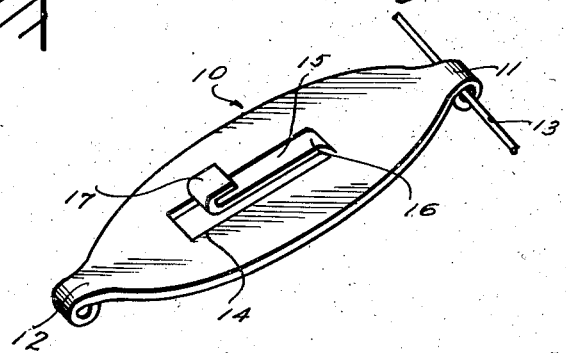
Inventor
Arthur M. Jenkins Patented Aug. 20, 1946

2,406,224

UNITED STATES PATENT OFFICE 2,406,224

CLIP OR FASTENER FOR STOVEPIPES AND THE LIKE

Arthur M. Jenkins, Oakland, Calif.

Application June 27, 1944, Serial No. 542,419

2 Claims. (Cl. 285—185)

My invention relates to a stove pipe fastener or clip intended for use in securely retaining a stove pipe end in a chimney, or for securing together two pipe-ends of any kind against the possibility of separating, or for similarly connecting an elbow to a straight pipe.

This invention consists mainly of a metal clip furnished at the joint of two pipe-ends or at the entry of a pipe into a flue.

One embodiment of the invention is illustrated on the drawings where the same reference numerals relate to the same details of the different views and wherein:

Figure 3 is a vertical section of a chimney with the end of a stove pipe secured in position by my clip.

Figure 4 is a perspective view of the clip or fastener itself.

Figure 1:
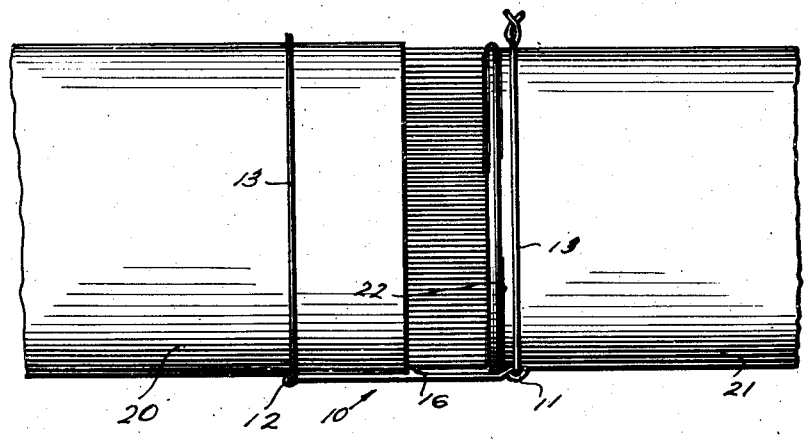
Figure 1 shows an exterior, longitudinal view of a pipe joint.

Referring first to Figure 4 of the drawings, this shows the fastener or clip 10 formed out of a single piece of pliable metal either by stamping, cutting or pressing. The same consists of an ovate piece of metal, straight sided or curved, rectangular or oval in general shape with each end 11 and 12 bent down to form an eyelet through which a soft piece of wire 13 is intended to pass for fastening the clip in position on a stove or other pipe.

In about the middle of the clip a rectangular slit 14 is made so as to leave the resulting tongue 15 having one end attached to the body of the clip as at 16, while the main portion is bent up to run parallel to the top surface of the clip leaving a space between of about the thickness of the pipe wall. The end portion 17 of the tongue 15 is turned back also leaving a space between its under surface and the top surface of the tongue 15 to permit the entry of the pipe wall thickness.

Figure 2:
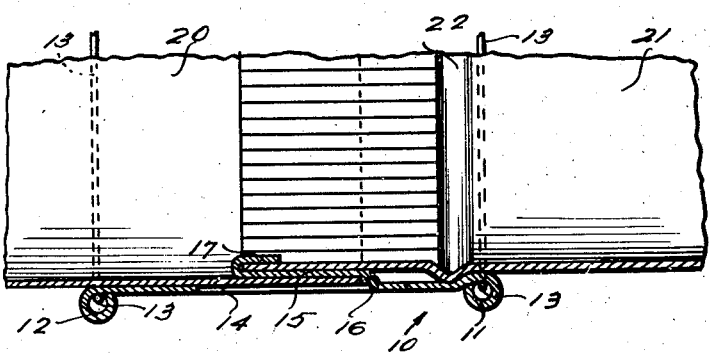
Figure 2 is a fragmentary view in section of a pipe joint.

In Figures 1 and 2 is exemplified a manner of securing two pipe ends 20 and 21 together of which pipe 21 is of slightly smaller diameter intended for entering a couple of inches into the larger pipe 20 as clearly seen in said figures and is provided with a swell or bead 22 around it in order to provide a good hold behind it for the wire 13 in the eyelet 11 of the clip 10. To apply the clip or fastener 10 the same is pushed in with the tongue 15 inside and part of the clip body outside the pipe wall until the bend 16 stops against the edge of the pipe 20 as seen in Figure 2. The eyelet 12 of the clip 10 is now considerably further back on the pipe 20 and is secured in this position by passing a wire 13 through said eyelet 12 and then winding it once or twice around the pipe 20 and twisting the ends tight so that the clip cannot slip out.

The smaller pipe 21 is now pushed into the opening of the larger pipe 20 until stopped by the curved back end or lip 17 of the tongue 15. The lip 17 grips over the edge of the pipe 21 preventing it to enter further into the larger pipe 20. At the same time the eyelet 11 of the clip 10 snaps under the bead 22 of the small pipe, so that the latter cannot slip out from the large pipe 20. In order to make the joint connection still more secure a metal wire 13 is also clipped through the eyelet 11 and passed around the pipe 21 and its ends twisted and tied together.

Referring now to Figure 3 the end of a stove pipe 25 is here shown inserted in the opening 26 leading into the flue 27 of a chimney 28. The first step is to insert a tight fitting thimble 29 in said opening 26 the thimble having a bead around its outer rim forming a stop against the chimney wall. The next step is to position the clip 10 in the bottom of the thimble with the rear part of the clip 10 and its eyelet 12 outside of the chimney and its forward end 13a uncurled and bent down over the inner edge of the thimble 29 and the face of the chimney wall 28. In this case the clip 10 has a kink or shoulder 30 to form an abutment against the outer edge of the thimble 29. This corresponds with a similar shoulder 31 on the stove pipe 25, so that a reduced neck 32 is formed beyond the shoulder 31, which neck 32 fits snugly in the thimble 26.

When the neck 32 is now pushed into the thimble 29, it encounters the tongue 15 of the clip 10 and is compelled to enter with its edge between the tongue 15 and the body 10 until it is stopped by the shoulder 16. As a further precaution to prevent the pipe to slip out of the thimble 29, a wire 13 is lastly passed through the eyelet 12 and wrapped around the pipe 25 and its ends twisted together.

It is evident that this clip or fastener can be applied to other than stove pipes.

It is to be understood that the invention as here disclosed is not limited to the details here described and shown but that the same may be varied widely without departing from the spirit of the invention as defined by the subjoined claims.

Having described the invention, what is claimed as new is:

1. A clip for firmly securing together the ends of two pipes of unequal diameter, comprising a plate having a tongue longitudinally in the middle thereof, and spaced above the body of said plate, the extremities of said plate, each constituting an eyelet, the end of the tongue forming a reversed lip providing a space between it and the body of the tongue, whereby with the pipes assembled the edge of the larger pipe fills said first space under the tongue and the edge of the smaller pipe fills the second space under said lip, and means encircling said pipes and engaging the respective eyelets holding said clip fast to the respective pipes, said spaces being radially off-set one to the other.

2. A clip for firmly securing together the ends of two pipes of unequal diameter, comprising a plate having a tongue longitudinally in the middle thereof, and spaced above the body of said plate, the extremities of said plate, each constituting an eyelet, the end of the tongue forming a reversed lip providing a space between it and the body of the tongue, whereby with the pipes assembled the edge of the larger pipe fills said first space under the tongue and the edge of the smaller pipe fills the second space under said lip, and means encircling said pipes and engaging the respective eyelets holding said clip fast to the respective pipes, said spaces being radially off-set one to the other, and means comprising wires encircling said pipes and engaging the respective eyelets for holding said clip fast to the respective pipes.

ARTHUR M. JENKINS.